United States Patent [19]
Gardemal, Jr. et al.

[11] Patent Number: 5,384,860
[45] Date of Patent: Jan. 24, 1995

[54] REAL TIME CONNECTIVITY ALGORITHM SYSTEM

[75] Inventors: Robert C. Gardemal, Jr., Irvine; Kurt J. Otto, Laguna Beach; Gregory A. Roberts, Costa Mesa, all of Calif.

[73] Assignee: Loral Aerospace Corp., New York, N.Y.

[21] Appl. No.: 932,649

[22] Filed: Aug. 20, 1992

[51] Int. Cl.$^6$ ............................................. G06K 9/00
[52] U.S. Cl. ........................................ 382/1; 382/22; 348/169
[58] Field of Search ............... 358/125, 126, 108, 109; 382/22, 1, 36, 38, 16, 23, 27, 26; 356/2, 376; 348/169, 170, 171, 172, 144, 145, 147; 364/456, 463; 352/48

[56] References Cited

U.S. PATENT DOCUMENTS

| | | | |
|---|---|---|---|
| 3,444,380 | 5/1969 | Webb | 382/23 |
| 4,005,415 | 1/1977 | Kossiakoff et al. | 343/5 |
| 4,223,387 | 9/1980 | Danielsson et al. | 364/515 |
| 4,489,388 | 12/1984 | DeGroot et al. | 364/517 |
| 4,593,406 | 6/1986 | Stone | 382/44 |
| 4,685,143 | 8/1987 | Choate | 382/25 |
| 4,736,439 | 4/1988 | May | 382/54 |
| 4,742,557 | 5/1988 | Ma | 382/51 |
| 5,031,226 | 7/1991 | Delange | 382/22 |
| 5,175,694 | 12/1992 | Amato | 358/125 |

Primary Examiner—David K. Moore
Assistant Examiner—D. R. Anderson
Attorney, Agent, or Firm—Harry G. Weissenberger; Anthony J. Karembelas

[57] ABSTRACT

A connectivity algorithm hardware implementation system wherein a subject pixel in a raster-scanned digitized image is declared a pixel of interest, in real time, by it being part of a potential target where every pixel on a closed pixel path enclosing the subject pixel differs in intensity from the intensity of the subject pixel by a predetermined intensity level, the system including a sequential delay line array producing a plurality of sequentially delayed digitized video signals representative of the spatial relationship of the pixels in the digitized image, these signals being coupled to a magnitude comparator array along with a delayed subject pixel contrast signal produced by a threshold circuit coupled to the subject pixel intensity causing the comparator array to produce a plurality of resultant signals representative of a comparison of the video signals with the subject pixel contrast signal, which resultant signals are coupled to a path checking circuit that simultaneously identifies all predetermined state closed paths around the subject pixel wherein every pixel on this closed path differs in intensity from an enclosed subject pixel by the predetermined intensity level.

14 Claims, 7 Drawing Sheets

REAL TIME CONNECTIVITY ALGORITHM SYSTEM

BACKGROUND

The present invention relates generally to an implementation of the connectivity algorithm, and more particularly to a novel hardware architecture that allows the connectivity algorithm to be implemented efficiently on every pixel in an image in real time.

It is discussed in said allowed application that in the forward-looking infrared (FLIR) imaging of a non-uniform scene such as terrain, point targets whose temperature is substantially higher or lower than that of the background (e.g. aircraft at long range) are often not detected by the target detection algorithms conventionally used in FLIR imaging. Conventional target detection algorithms can also falsely mark many background clutter features as targets. Such target detection algorithms include leading-edge-trailing-edge detection and least-mean-squared (LMS) filtering. One-dimensional LMS filters can produce false target indications on edges of background objects, as is the case for leading-edge-trailing-edge detection, and even the use of two orthogonal one-dimensional LMS filters can still produce false target indications on corners. It has been found to be necessary, in order to isolate point targets for a clear display, to determine the spatial extent and spatial connections of an object of interest in real time. This is a difficult computational feat.

The inventors are aware of several references either generally dealing with the problem or a similar one, which references are identified as follows:

U.S. Pat. No. 4,005,415, concerns an automated radar data processing system comprised of signal processing circuitry and programmed general purpose digital computer apparatus performing detection, classification and tracking functions with respect to all targets within the field of view of the radar. The signal processing circuitry includes an adaptive video processor which receives the raw radar video signals and which derives a threshold from the noise, clutter, or electronic countermeasures signals in the immediate vicinity of the target and passes only those incoming signals which satisfy the detection criteria in terms of signal to noise ratio and extent. The signal processing circuitry is interactive with target track data derived and stored in the computer apparatus, so that the specific signal processing applied to any target by the adaptive video processor is optimized in accordance with the track status of that target.

U.S. Pat. No. 4,233,387. This invention concerns a device that examines a two dimensional quantized picture to determine whether any objects are closer together than a set minimum distance. The quantized picture has incremental areas assigned values of 0 or 1 corresponding to the presence or absence of an object. An array of interconnected logical cells identifies the presence of a separate object in the picture. The dimensions of the array correspond to the acceptable minimum distance between objects. The described device contains only basic digital logic components and processes picture information without the use of a computer program.

U.S. Pat. No. 4,489,388, concerns a plot generator for selecting angle, range and target azimuth extent data produced for targets and stored in a register. The generator comprises a video processor for generating the data on the reception of sensor signal data. This references describes a system based on dividing the radar coverage into a number of range-azimuth zones and on establishing a standard number of plots to be processed for each zone, which standard number depends on the position of the zone in respect of the target approach routes, and allowing for a maximum number of plots to be processed by the central processor each antenna revolution.

U.S. Pat. No. 4,593,406. The invention described in this reference involves a computerized method and point location system apparatus for ascertaining the center of a primitive or fundamental object whose shape and approximate location are known. The technique involves obtaining an image of the object, selecting a trial center, and generating a locus of points having a predetermined relationship with the center. Such a locus of points could include a circle. The number of points overlying the object in each quadrant is obtained and the counts of these points per quadrant are compared. From this comparison, error signals are provided to adjust the relative location of the trial center. This is repeated until the trial center overlies the geometric center within the predefined accuracy limits.

U.S. Pat. No. 4,685,143. This invention relates to recognition of images by the construction and analysis of edge maps in an automatic image processing and recognition scheme. In order to overcome the disadvantage of the usual requirement of the storage of large amounts of information, the techniques described in this reference computes an edge spectrum from the edge map. The edge spectrum contains useful information in a form even more condensed than the edge map from which it is derived and is processed by any of several feature detectors to determine whether, for instance, the edge map contains mutually orthogonal edges or other structural details useful in identifying the image.

U.S. Pat. No. 4,736,439. This invention pertains to image transformation or pre-recognition processing using adaptive quantization based on a local average. The image preprocessing technique described in this reference involves image preprocessing by median filtration in which the median value of one or more rows of pixels of a digitized image represented by a matrix, as might result from a raster scan, is subtracted from the values of individual pixels to filter low and high frequency noise.

U.S. Pat. No. 4,742,557, concerns a method and a system for extracting relevant character information from fields of scanning data which contain unwanted background information and noise that is picked up in the scanning process. The system of this reference uses not only a gray level comparisons, but also the comparison of topological features (i.e. geometrical distribution of character pixels), to adaptively adjust a threshold for each individual check which threshold determines the cut-off from consideration of character information.

In contradistinction to the techniques described in and utilized by the above-noted prior art references, the invention described in said allowed application utilizes the connectivity algorithm, where the imaging electronics examine the pixel intensities of pixels forming a closed path around the centroid of a potential target object. The examining electronics require the pixels' intensities to differ in a predetermined manner from the centroid's intensity in order to be part of the path. If such a path can be drawn before any pixel of the path exceeds a predetermined distance from the centroid, the potential target object is identified as a real target and can be displayed as such.

In the past, the connectivity algorithm could only be performed on real time video data by processing a pre-filtered subset of pixels with a general purpose processor. This approach required a considerable amount of both hardware and software. Targets that did not pass the pre-filter could not be detected. The hardware architecture and implementations of the present invention eliminate these problems and provide some features that enhance the basic connectivity algorithm.

SUMMARY OF THE INVENTION

In view of the foregoing factors and conditions characteristic of the prior art, it is a primary object of the present invention to provide a new and improved connectivity algorithm system.

It is another object of the present invention to provide a connectivity algorithm system that allows the connectivity algorithm to be implemented efficiently on every pixel in an image in real time.

It is still another object of the present invention to provide a connectivity algorithm system that allows the connectivity algorithm to be performed on real time video data without processing a pre-filtered subset of pixels with a general purpose processor.

It is yet another object of the present invention to provide a connectivity algorithm system that enhances both the air-to-air and air-to-ground roles of high performance military aircraft by providing the basic target detection/clutter rejection for automatic detection of targets in FLIR pod video imagery.

It is still a further object of the present invention to provide a connectivity algorithm system that requires much less hardware and software than a general purpose processor approach would require to test every pixel in real time video imagery.

In accordance with an embodiment of the present invention, a connectivity algorithm system declares that a subject pixel in a raster-scanned digitized image is a pixel of interest by being part of a potential target where every pixel on a closed path enclosing the subject pixel differs in intensity from the intensity of the subject pixel by a predetermined intensity level. This system includes timing signal, threshold signal, and digitized video signal inputs, and includes sequential delay line array means coupled to the timing signal and digitized video signal inputs for producing a plurality of sequentially delayed digitized video signals representative of the spatial relationship of the pixels in the digitized image. The invention also includes threshold circuit means coupled to the threshold signal input and to a central one of the plurality of sequentially delayed digitized video signals for producing a delayed subject pixel contrast signal. Magnitude comparator array means are coupled to the timing signal input, to the threshold circuit means, to the digitized video signal input and to the sequential delay line array means for simultaneously producing a plurality of resultant signals representative of a comparison of the video signals with the subject pixel contrast signal. The invention further includes path checking circuit means coupled to the timing signal input and to the comparator array means for simultaneously identifying all predetermined state closed paths around the subject pixel wherein every pixel on the closed path differs in intensity from an enclosed subject pixel by a predetermined intensity level. Target position generator means are coupled to the timing signal input and to the path checking circuit means for producing a target position signal associated with only those path signals having the aforementioned predetermined state. Still further, the invention includes target data memory means coupled to the target position generator means and is responsive to the target position signal for producing a connectivity output signal representative of the position of a pixel of interest.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

As previously noted, the connectivity algorithm basically sets forth that a pixel is part of a potential positive contrast target if an arbitrary closed path (of any shape) around the subject pixel can be found where every pixel on the path is dimmer than the subject pixel by a given threshold value. Likewise, negative contrast targets must be dimmer than all pixels in the path by a given threshold. In order to have the highest probability of detecting the target pixel, the path chosen should be able to snake its way around any pixels that are of a contrasting intensity by a predetermined intensity level. The shape of the path may either be fixed or arbitrary. The first embodiment of the present invention concerns a fixed shape path implementation.

Figure 1:
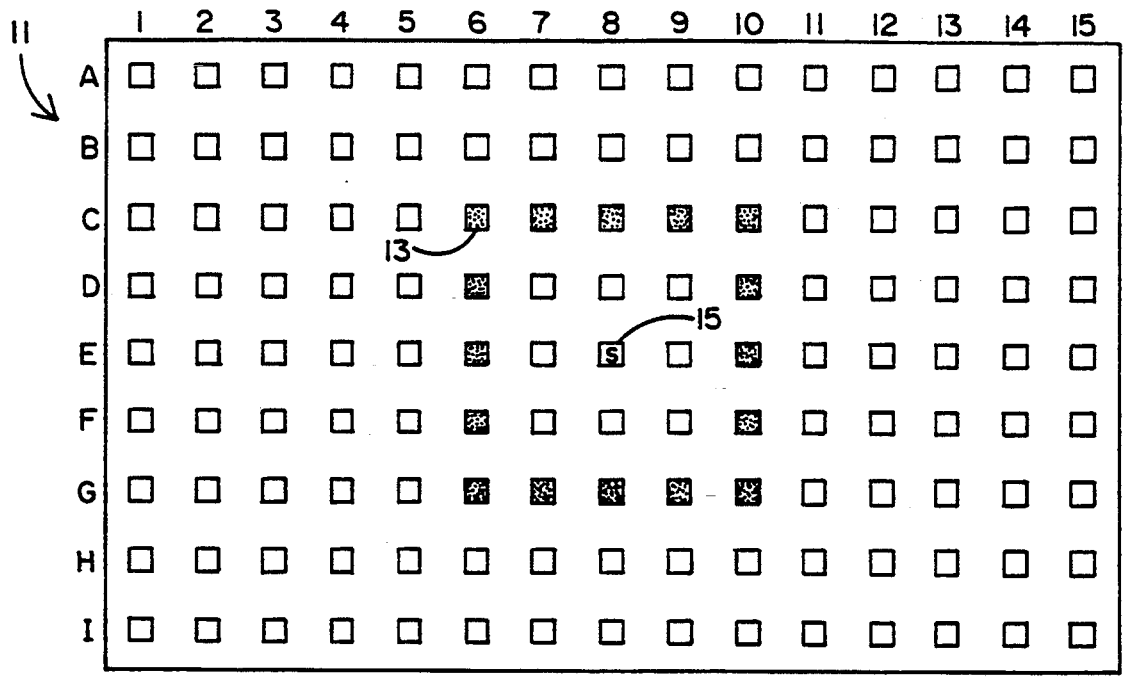
FIG. 1 is an exemplary matrix which represents an array of pixels.

Referring now to the drawings, and more particularly to FIG. 1, there is shown a raster-scanned digitized image or pixel array 11 in which is defined a rectangular path 13 consisting of five pixels by five pixels (darkened pixels), with a subject pixel 15 at the center of the rectangular path 13. Had a 4-by-9 pixel path been chosen, then the subject pixel would have been offset from the center by one-half pixel vertically, for example. If the subject pixel 15 is greater in intensity than all the pixels on the path 13 by a given threshold, then the subject pixel 15 could be declared to be part of a potential target. By viewing the array 11 of pixels in FIG. 1, it can be seen that many fixed shape paths could be constructed in a manner similar to the 5-by-5 rectangle of path 13. The key to knowing if one of these paths satisfies the conditions of the connectivity algorithm is how these pixels compare in magnitude to a threshold-biased subject pixel, as hereinafter will be described.

In order to check many possible paths in real time, all of the pixels in the array 11 of FIG. 1 need to be compared to the subject pixel 15 in one pixel clock or period. This is accomplished by delaying, in this embodiment of the invention, eight lines of digitized video and feeding them, along with the current line, into an array of magnitude comparators. For example, in a connectivity algorithm system 21, schematically illustrated in FIG. 2, the system includes a timing signal input 23 coupled to a timing signal line 25, a digitized video signal input 27 with an associated video signal line 29, a threshold signal input 31, a sequential delay line array 33, and a magnitude comparator array 35.

The signal coupled to the input 27 is a raster-scanning-derived real time digitized image pixel stream, and the threshold signal coupled to the input 31 may be an empirically-derived optimized dc, stepped, or smooth wave-form signal adapted to maximize signal-to-noise, improve clutter rejection, and/or selected for target size and/or shape recognition. It may also be manually varied by a pilot, for example, to provide a desired sensitivity.

Where there are N lines of magnitude comparators, the delay line array 33 includes N−1 conventional line delay elements 37 each connected sequentially, that is, an output terminal 39 of one such element is connected to an input terminal 41 of the next sequential element 37. Thus, for a 5-by-5 rectangular array, N=4 and there are 4 line delay elements 37. In a 4-by-9 rectangle, N=9 and there would be 8 line delay elements.

The subject pixel 15 is sampled from the center (N/2) "subject pixel" line 43, and coupled to a contrast circuit 51 which includes an adder/subtractor element 53 and a contrast circuit delay element 55. Also input to the contrast circuit 51 is the above-described threshold signal of predetermined magnitude coupled from the threshold signal input 31. For a positive contrast situation where the subject pixel intensity is greater than all the pixels on the path, the threshold signal is subtracted from the sampled signal and delayed by the delay element 55. This contrast signal is provided to a threshold-biased subject line 57 at an output 59 of the circuit 51. The sampled signal is delayed to coincide with the subject pixel when the subject pixel 15 is in the center of the sampled array. Where the subject pixel is less in magnitude than the pixels on the path, (negative contrast), the threshold signal is added to the magnitude of the subject pixel in the adder/subtractor element 53.

Figure 3:
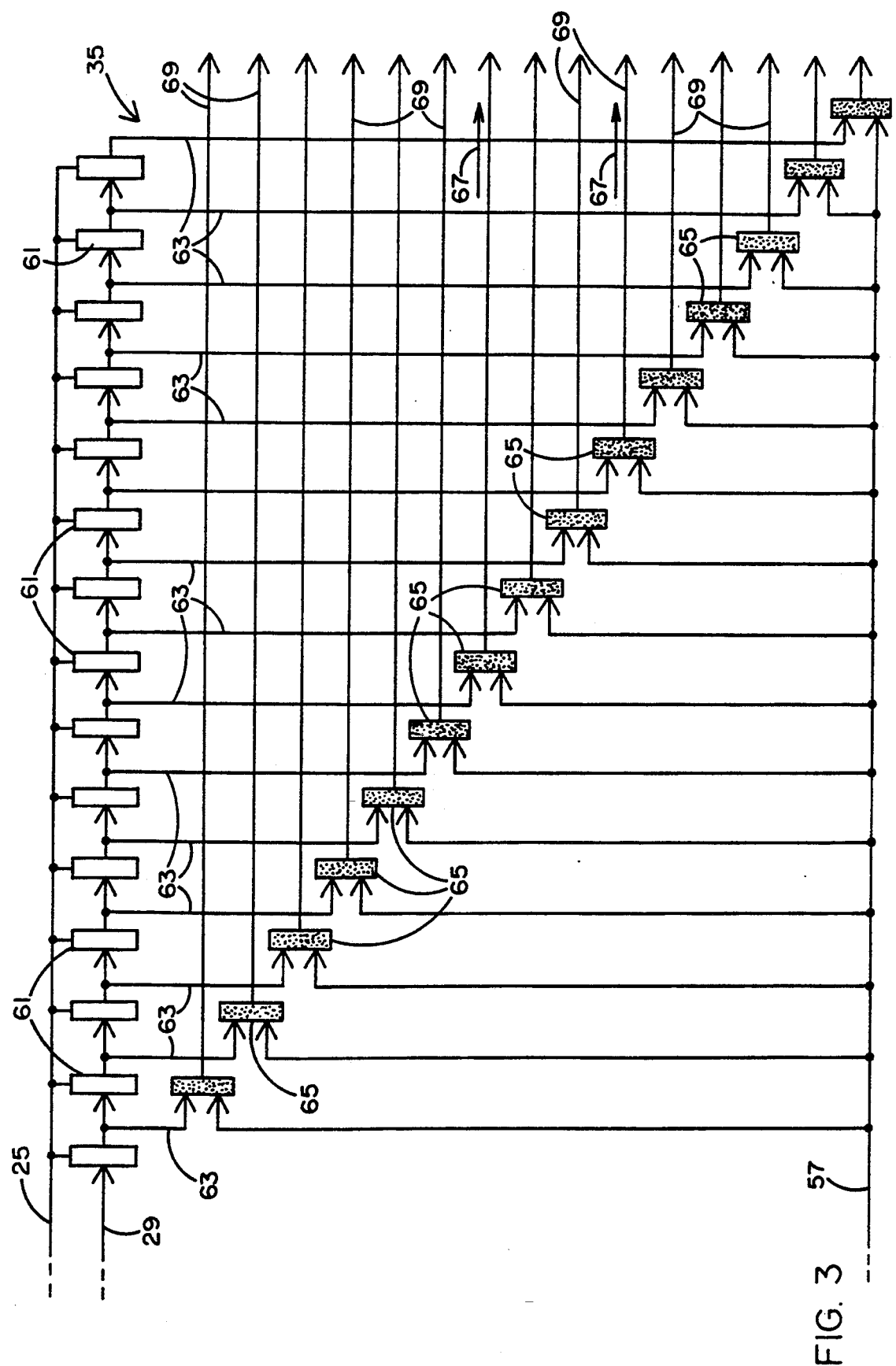
FIG. 3 is a schematic representation of a portion of the comparator array illustrated in FIG. 2.

In this embodiment, as shown in more detail in FIG. 3, the comparator array 35 is composed of five rows of fifteen conventional registers 61, corresponding to pixel rows A–I and pixel columns 1–15 in the pixel array 11 of FIG. 1. Only a single row of registers is herein illustrated for the sake of simplicity. An output 63 of each register 61 in each row feeds the next register 61 in that row in a bucket brigade fashion, as shown in the upper portion of FIG. 3. The output of each register is also coupled via register output lines 63 to an associated conventional magnitude comparator element 65 that compares its associated register's output with the subject pixel's threshold-biased signal on line 57. The results of all the compares are available simultaneously as compare result signals 67 on compare output lines 69.

Figure 4:
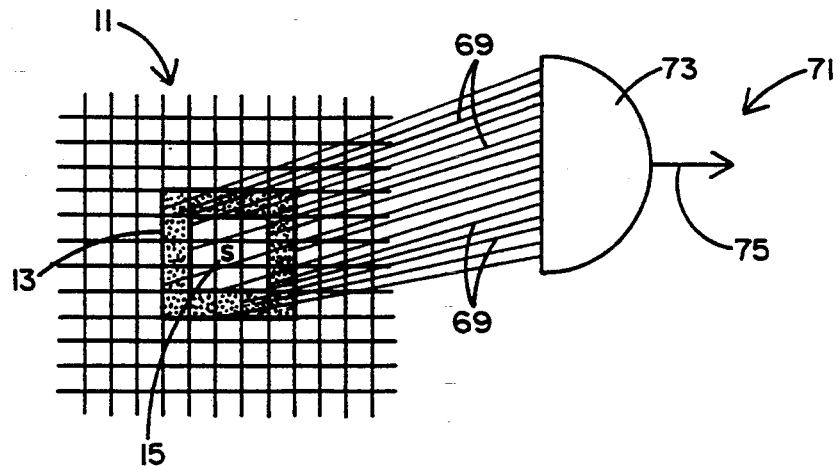
FIG. 4 is a partially pictorial schematic representation of a portion of the 'and' window array of FIG. 2.
Figure 2:
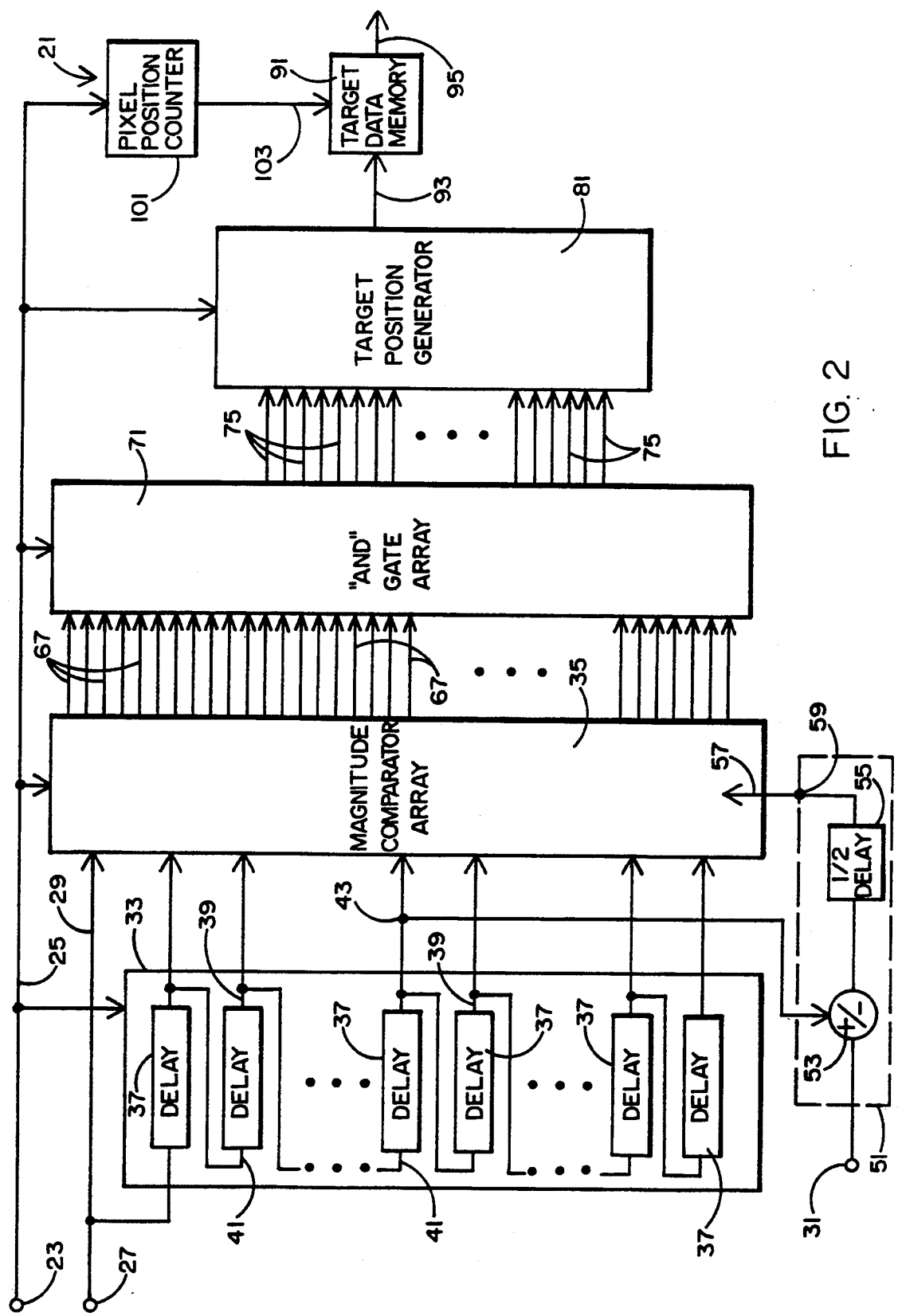
FIG. 2 is a schematic block diagram of the connectivity algorithm system in accordance with the present invention.

As shown in FIG. 2, and more illustratively than schematically in FIG. 4, the result signals 67 conveyed on lines 69 are coupled to an array of 'and' gates 71 (only one being shown). Each 'and' gate 73 in the array 71 receives result signals from a different set of compare array elements, each defining a different closed rectangular path. In other words, the inputs to each 'and' gate 73 are all the comparison results needed to check a particular path. In the case of the 5-by-5 path (or window), the comparison results of all 16 pixels (darkened pixels) in path 13 are coupled to a conventional 'and' gate 73 in the array of 'and' gates 71. If all the inputs are 'digital' ones, then the subject pixel 15 was different, by at least the threshold-biased compare signal level, than all the pixels in the path 13, and the subject pixel can be considered to be part of a potential target. This will be indicated on a window status signal, for example, as a digital one on an 'and' gate array output line 75 coupled to an associated input of a conventional 'or' gate in a target position generator 81 (see FIGS. 2 and 5).

As was noted above, there are many fixed paths that can be defined in the pixel array of FIG. 1, for example. It should then be clear that if each defined path is coupled to a different one of the array of 'and' gates 73 in the array 71, then many paths can be checked simultaneously. The outputs, or window status signals of all the 'and' gates can then be "or'ed" together with a conventional 'or' gate to determine if the subject pixel 15 was detected in any of the paths. If such a pixel is detected, then its position in the image, from a conventional row and column counter, can be stored in a target data memory module 91, of a type, well known in the art, via a target position generator output line 93. The memory module 91 then couples the stored target data to a conventional system processor (not shown) via a stored target memory output line 95.

Figure 5:
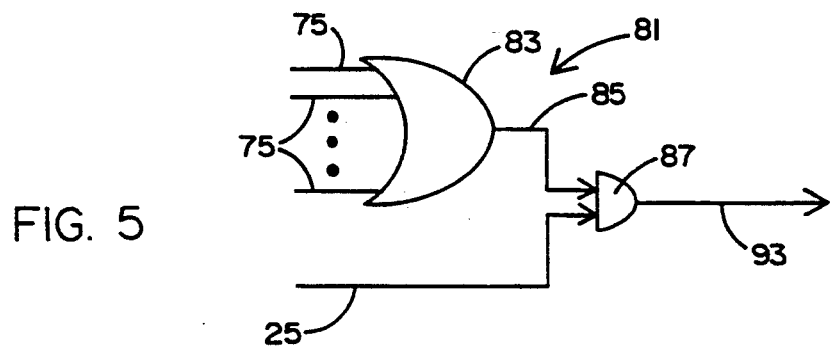
FIG. 5 is a schematic representation of a portion of the target position generator of FIG. 2.

An exemplary portion of the target position generator 81 and associated components are shown in FIG. 5. The generator 81 includes a Y input 'or' gate having inputs coupled to 'and' gate result output lines 75 from each window in the 'and' window array 71. If any window result signal is a "1", then an 'or' gate output line 85 carries the signal to an input of an 'and' gate 87, the other input of which is coupled to the clock timing signal via the line 25 to provide the memory write signal on line 93. This subject pixel's position is provided to the target data memory 91 by a conventional pixel position counter circuit 101 in the system 21 via a position counter output line 103.

Figure 6:
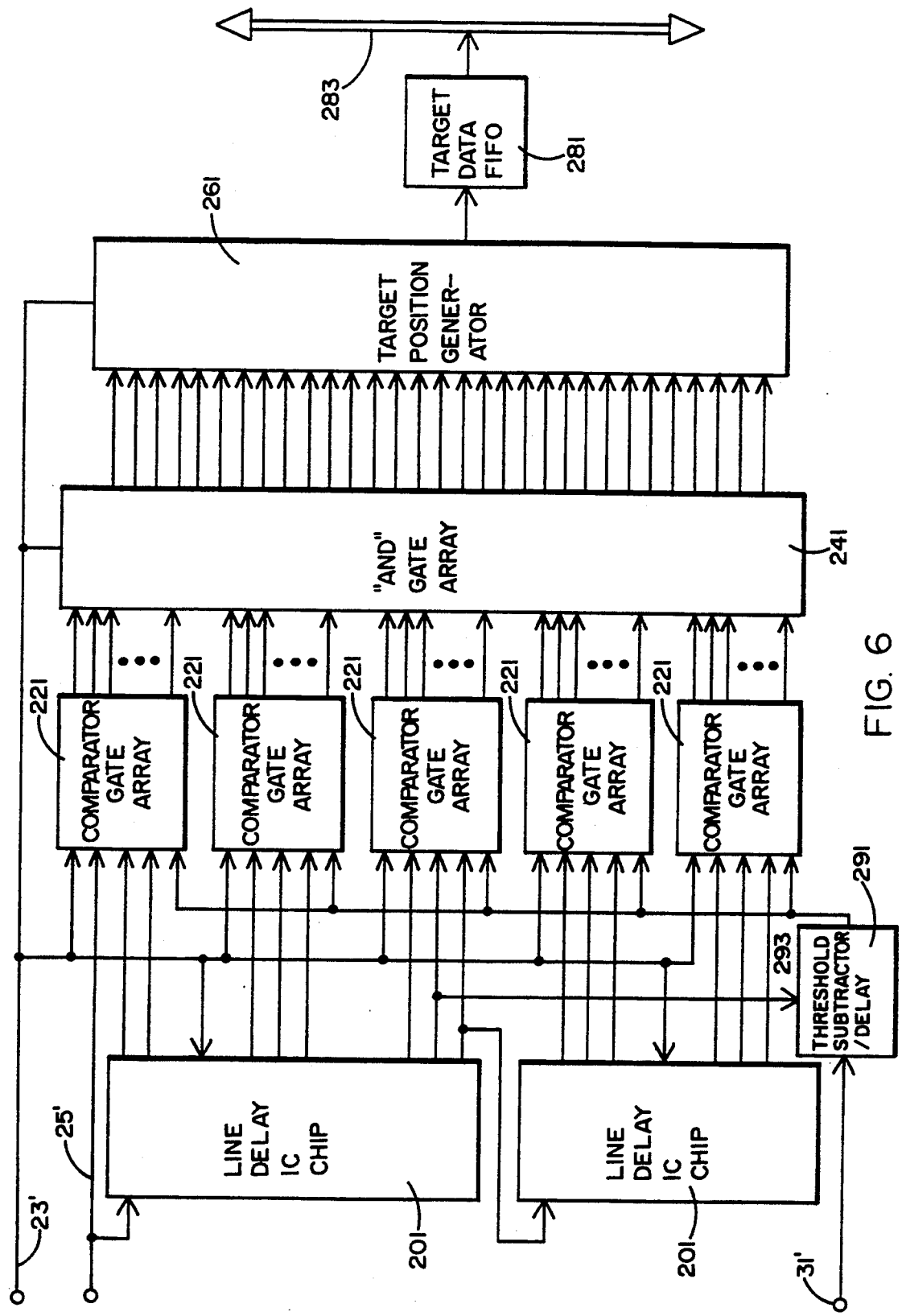
FIG. 6 is a block schematic diagram of a field programmable gate array implementation of the invention according to another embodiment of the invention.

Reference is now made to another embodiment of the present invention illustrated in FIG. 6. Here, the invention is implemented using multiple, commercially available, line delay integrated circuit (IC) chips 201 appropriately coupled to five off-the-shelf field programmable gate arrays 221 (FPGA) or logic cell arrays for a 7-by-5 compare array. The logic cell arrays 221 are, in turn, coupled to a single FPGA 241 for a 31 window 'and' array coupled to a single FPGA used as a target position generator 261, the output of which is provided to a conventional target data FIFO 281 having an output connected to a conventional 32 bit VME bus 283.

Also in accordance with this embodiment of the invention, still another single FPGA 291 is coupled to the delayed center (subject pixel) line 293 and to the threshold input line 31', and operates as threshold subtrator/VME bus compatible interface that is, in part, similar in operation to the contrast circuit 51 in the first described embodiment. This structure has been implemented and fully tested at a 16 MHz pixel rate and has been shown to be an excellent target detector. The entire implementation fits on one VME bus compatible board. A second such board may be used in conjunction with the first VME board to discriminate both positive and negative contrast targets, that is, the second board utilizes a single FPGA as a threshold adder/VME interface.

Figure 7:
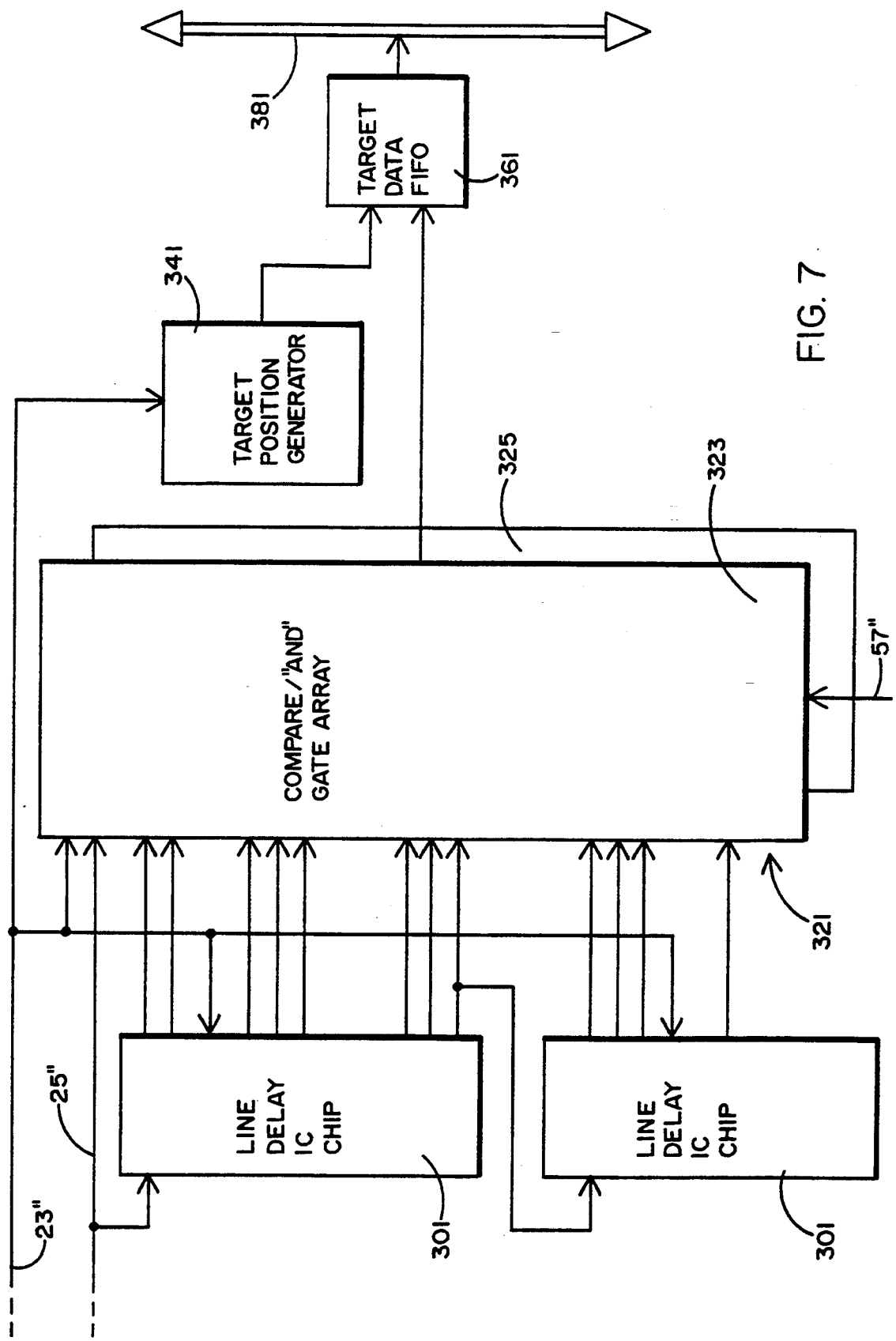
FIG. 7 represents a mask programmed gate array implementation according to still another embodiment of the invention.

Yet another embodiment of the present invention is shown in FIG. 7. Like the embodiment of FIG. 6, this embodiment incorporates a pair of conventional line delay integrated circuits 301, but the outputs of these ICs are coupled to a custom mask programmed gate array 321 which comprises both a 13-by-19 compare array portion 323 and a 48 window 'and' array portion 325. The output from this gate array 321 is coupled, along with an output from an external FPGA target position generator 341 to a commercially available target data FIFO 361 that outputs to a standard VME bus 381. The gate array 321 includes a feature where tying a control pin (not shown) high or low configures the gate array to detect either positive or negative contrast targets. Thus, two such gate arrays are required to detect both types of target in the same image. This gate array embodiment has been tested successfully up to a 20 MHz pixel rate.

The fixed path embodiments described above also allow certain target characteristics, other than intensity, to be included in detection criteria. For example, by selecting only small paths or windows, large targets can be excluded in the detection process. On the other hand, requiring pixels to fail small windows and pass large windows selects for large targets. Determining the smallest window that a target passes can help determine the target's size. Window shape can also be used to help discriminate desired targets. For example, long, narrow windows can discriminate for resolvable bombers with side aspect orientation.

Another aspect of the present invention involves the use of an arbitrary path instead of the fixed path techniques describe above. For small arrays of pixels, the fixed path method can be used to test all possible paths. Each possible path is simply assigned an 'and' gate. This approach quickly generates excessively large numbers of 'and' gates, as the size of the array increases.

Figure 8:
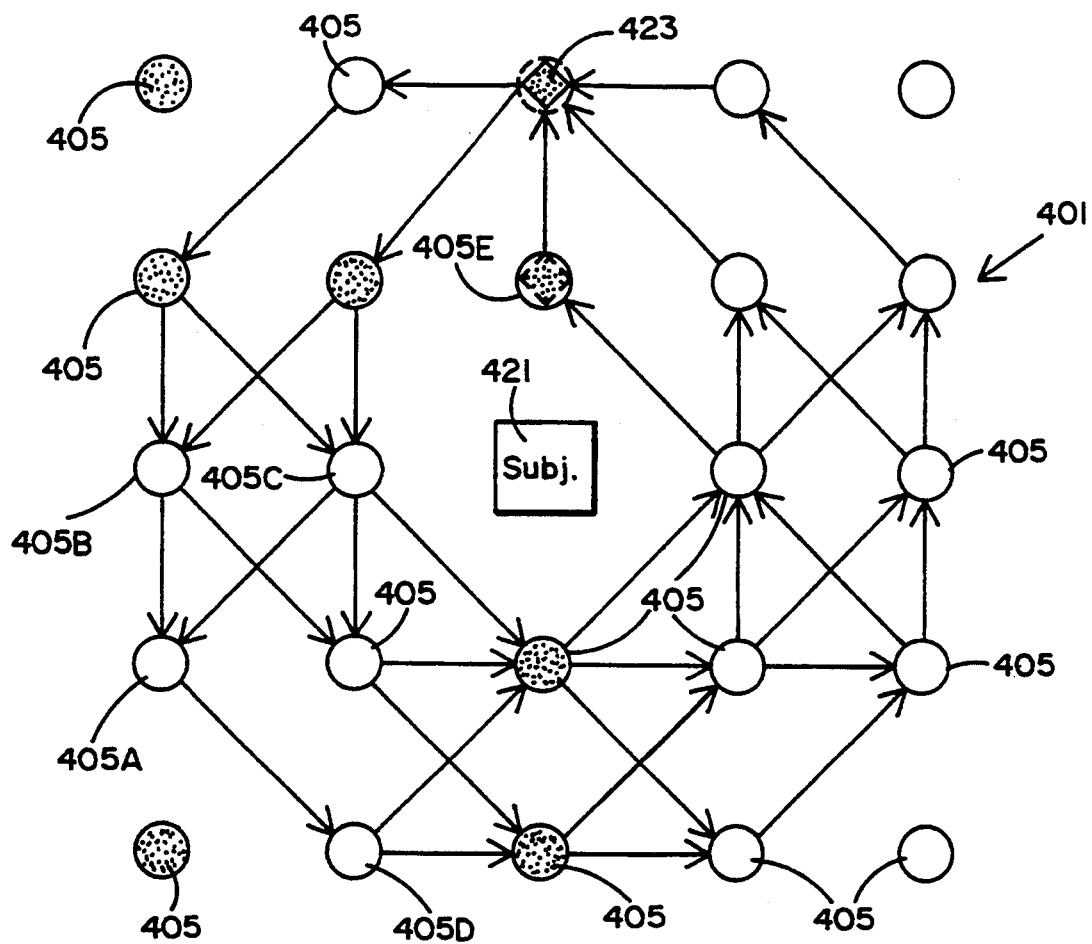
FIG. 8 illustrates an exemplary 5-by-5 cell array as may be utilized with an arbitrary path technique in accordance with yet another embodiment of the invention.
Figure 9:
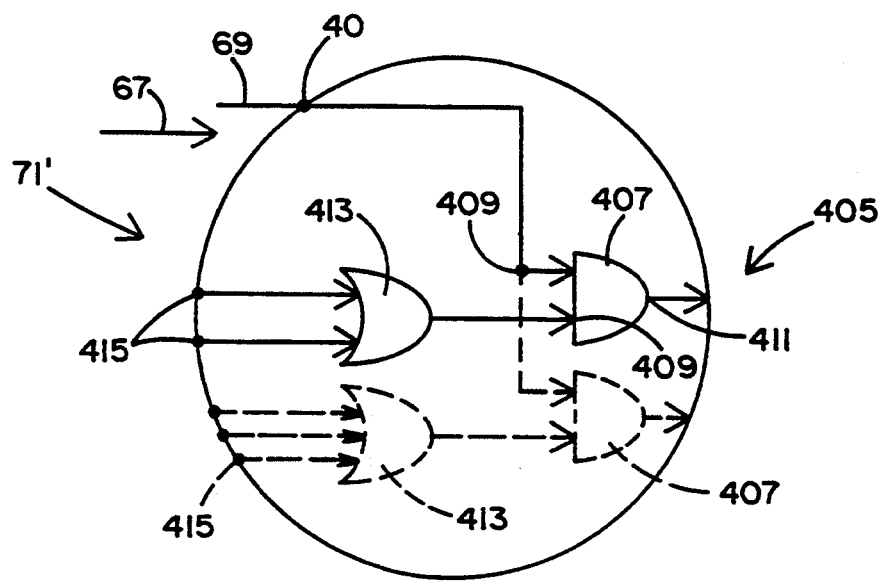
FIG. 9 schematically illustrates a hardware technique for constructing a standard cell in an arbitrary path embodiment of the invention.
Figure 10:
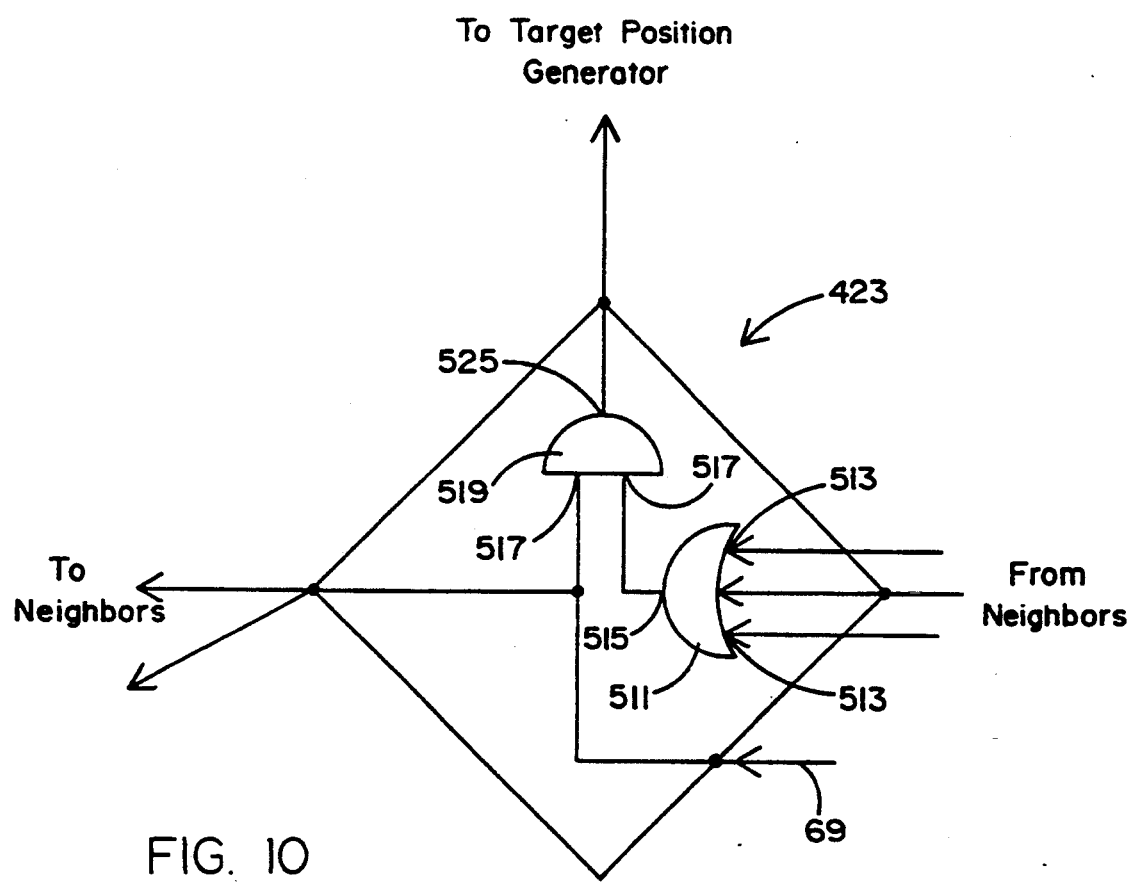
FIG. 10 schematically illustrates a hardware technique for constructing a starting point cell in an arbitrary path embodiment of the invention.

FIGS. 8, 9, and 10 show a hardware technique for finding if an arbitrary path exists where every pixel on the path enclosing a subject pixel differs in intensity from the intensity of the subject pixel by a predetermined intensity level. This approach only requires the substitution of the logic of an arbitrary path cell array 71' for the array of 'and' gates 71 in the system shown in FIG. 2.

Although an arbitrary path embodiment 71' is here described for a 5-by-5 pixel array 401, it should be understood that this scheme can be expanded to any sized array. It should also be noted that in FIG. 8, for the sake of simplicity, the cell structures to be hereinafter described, occupy the same positions as the pixels to which they correspond.

According to this embodiment, a standard "cell" circuit, shown as a circle 405 in FIG. 8, is assigned to all but a starting point cell in the array. Each standard cell circuit 405 includes at least one 'and' gate 407 with inputs 409 and an output 411, and at least one 'or' gate 413 having inputs 415 and an output 417 coupled to one of the 'and' gate inputs 409. The other of the 'and' gate inputs 409 is coupled to an incoming associated compare result signal 67 from a corresponding magnitude comparator output line 69.

The number of 'or' gate inputs 415 for any standard cell circuit 405 correspond to the number of neighbor cell circuit 'and' gate outputs that are coupled to it. For example, standard cell 405A (represented in FIG. 9) has inputs from neighbor cells 405B and 405C, and has a single output to its neighbor cell 405D. Other standard cells may have one or more neighbor cell inputs and one or more neighbor cell outputs, and additional 'and' and 'or' gates may be required, as illustrated by dashed outlines in FIG. 9.

As can be seen in FIG. 8, a subject pixel 421 is centered in the array 401, and what is known as a "starting point" cell is represented by a diamond-shaped cell 423 that is schematically illustrated in more circuitry detail in FIG. 10. Here, the cell 423 is shown to include an 'or' gate 511 having inputs 513 and an output 515 coupled to one of two inputs 517 of an 'and' gate 519. The outputs from neighboring standard cells 405 are coupled to the 'or' gate inputs 513, and, very importantly, the compare result signal 67 from the magnitude comparator output line 69 associated with this starting point cell is coupled to the other of the 'and' gate inputs 519 and also out of this cell to the inputs of neighboring standard cells. Thus, the intercellular 'status' output of a starting point cell is its compare result signal 67. Also in contrast to the circuitry of a standard cell, the 'and' gate output, available at output 525 of gate 519, is coupled by way of line 75 only to an associated input of the target position generator 81.

At each pixel clock, the status of the starting point cell will propagate into the connection net. In a positive contrast situation, if the starting point cell 423 has an intercellular output level (its incoming compare result signal 67), that is less than that of the subject pixel by the threshold level, it will pass a digital 'one' to the cell or cells connected to it. Otherwise, it will pass a digital zero. If a 'one' is passed to a standard cell, and that cell's corresponding pixel has a level that is less than the subject pixel by the threshold level, then and only then will that cell pass a digital "one" on to the cells connected to its output. Again, the mechanism for this logic is shown in FIG. 9.

If a closed path exists in an array (that is where the intensity level of the subject pixel 415 is greater than that of all pixels in the path by the threshold level) that contains a starting point cell 423, then the 'one' from the starting point cell will propagate all the way around the subject pixel 421 and come back to an input 513 of the starting point cell. At this point, the starting point cell will produce a digital 'one' from its output 75, and the subject pixel 421 can be declared to be part of a potential target and this pixel's location in the image stored in the target data memory module 91, as herein before described in connection with the pixel path embodiment.

There is a net of intercellular connections associated with any starting point cell. The net represents the minimum number of intercellular connections in an array that are required to find any closed path beginning at a starting point cell. Where there are N columns of pixels in a square pixel array, for example, there will be (N−1)/2 nets to be implemented in order to identify closed paths around a subject pixel. Thus, for example, in the 5-by-5 array shown in FIG. 8, there are (5−1)/2 or 2 nets needed, and cell 405E (dashed diamond) could be a starting point cell for the second net. In this case, cell 423 would be implemented as a standard cell (dashed circle).

Since it can snake a path around noisy pixels, the arbitrary path technique is best suited to finding very low contrast targets in a noisy background. The cost of this sensitivity is having to propagate a signal through many levels of logic. This forces the use of a high speed gate array in implementing a practical system. On the other hand, fewer levels of logic are required for the fixed path method, and allows the use of slower, less expensive implementations.

From the foregoing it should be understood that there has been described a new and improved real time connectivity algorithm system that declares that a subject pixel in a raster-scanned digitized image is a pixel of interest by being part of a potential target where every pixel on a closed path enclosing the subject pixel differs in intensity from the intensity of the subject pixel by a predetermined intensity level.

It is to be understood that the above-described embodiments are merely illustrative of some of the many specific embodiments which represent applications of the principles of the present invention.

Clearly, numerous and other arrangements can be readily devised by those skilled in the art without departing from the scope of the invention.

What is claimed is:

1. A real time connectivity algorithm system declaring that a subject pixel in a raster-scanned digitized image is part of a potential target where every pixel on a closed path enclosing the subject pixel differs in intensity from the intensity of the subject pixel by a predetermined intensity level, the system comprising:

timing signal, threshold signal, and digitized video signal inputs;

sequential delay line array means coupled to said timing signal and digitized video signal inputs, for producing a plurality of sequentially delayed digitized video signals representative of the spatial relationship of the pixels in the digitized image;

contrast circuit means coupled to said threshold signal input and to a central one of said plurality of sequentially delayed digitized video signals for producing a delayed subject pixel contrast signal;

magnitude comparator array means coupled to said timing signal input, to said contrast circuit means, to said digitized video signal input, and to said sequential delay line array means for simultaneously producing a plurality of resultant signals each representative of a comparison of said video signals with said subject pixel contrast signal for a different closed path;

path checking circuit means coupled to said timing signal input and to said comparator array means for simultaneously identifying all of said closed paths around said subject pixel wherein every pixel on said closed path differs in intensity from an enclosed subject pixel by a predetermined intensity level;

target position generator means coupled to said timing signal input and to said path checking circuit means for producing a target position signal associated with only those path signals identified by said path checking circuit means; and target data memory means coupled to said target position generator means for producing a connectivity output signal representative of the position of said pixel of interest when a target position signal has been produced.

2. The real time connectivity algorithm system of claim 1, wherein said sequential delay line array means includes sequentially-connected line delay elements, an input of a first of said line delay elements being coupled to said digitized video signal input, and an output of each of said delay elements being coupled to an associated input of said magnitude comparator array means.

3. The real time connectivity algorithm system of claim 2, wherein said magnitude comparator means comprises N lines, and wherein said sequential delay line array means comprises N−1 said line delay elements.

4. The real time connectivity algorithm system of claim 3, wherein said sequential delay line array means includes a subject pixel output line at the N/2th delay element.

5. The real time connectivity algorithm system of claim 1, wherein said contrast circuit means includes an adder/subtractor element for selectably adding or subtracting said threshold signal to or from said subject pixel contrast signal, and a contrast circuit delay element, an input of said adder/subtractor element being coupled to said threshold signal input and to said central one of said plurality of sequentially delayed digitized video signals, and an output of said contrast circuit delay element being coupled to an input of said magnitude comparator array means.

6. The real time connectivity algorithm system of claim 1, wherein said magnitude comparator array means includes a first plurality of row registers comprising a second plurality of said registers in each of said rows, an output of each of said registers in each of said first plurality of rows being coupled to an input of a next sequential one of said registers, said magnitude comparator array means also including a plurality of magnitude comparator elements, each of said comparator elements being coupled to said output of a different one of said registers and to said delayed subject pixel contrast signal, said comparator elements having outputs producing said plurality of resultant signals.

7. The real time connectivity algorithm system of claim 1, wherein said path checking circuit means includes rectangular path array means for simultaneously identifying all of said closed paths around said subject pixel which are rectangular.

8. The real time connectivity algorithm system of claim 7, wherein said rectangular window array means includes an array of 'and' gates each gate having a set of inputs and an output, each of said sets of inputs being coupled to associated ones of a different set of said compare elements, each of said different sets of compare elements defining a different one of said closed rectangular paths.

9. The real time connectivity algorithm system of claim 1, wherein said path checking circuit means includes arbitrary path array means for simultaneously identifying all arbitrary paths around said subject pixel wherein every pixel on said arbitrary closed path differs in intensity from said enclosed subject pixel by a predetermined intensity level.

10. The real time connectivity algorithm system of claim 9, wherein said arbitrary path array means includes a starting point cell and neighboring standard cells disposed about said subject pixel, wherein a digital "one" will be output externally of said cells only when a digital "one" has propagated from said starting point cell through those of said standard cells around said subject pixel and back to said starting point cell, said standard cells only propagating said "one" when their associated resultant signal is a digital "one".

11. The real time connectivity algorithm system of claim 10, wherein each said standard cell includes at least one "and" gate having two inputs and a neighboring cell output, and also includes at least one "or" gate having at least one neighboring cell input and an output coupled to one of said "and" gate inputs, the other of said inputs being coupled to a one of said resultant signals corresponding to the pixel position represented by said standard cell.

12. The real time connectivity algorithm system of claim 10, wherein said starting point cell includes an "and" gate having two inputs and an output coupled to an associated input of said target position generator means, said starting point cell also including an "or" gate having neighboring cell inputs and an output coupled to one of said two "and" gate inputs, the other of said inputs being coupled to said resultant signal 67 corresponding to the pixel position represented by said starting point cell, said starting point cell further including a neighboring cell output comprising said resultant signal input thereto.

13. The real time connectivity algorithm system of claim 10, wherein there is a net of intercellular connections associated with said starting point cell, said net representing the minimum number of intercellular connections in a pixel array required to define a closed cell path containing a starting point cell.

14. The real time connectivity algorithm system of claim 13, wherein the largest closed cell path is defined by a square pixel array having N columns, and wherein there are $(N-1)/2$ of said nets in said arbitrary path array means.

* * * * *